(12) United States Patent
Yocom

(10) Patent No.: US 6,346,326 B1
(45) Date of Patent: Feb. 12, 2002

(54) COATED MOISTURE IMPERVIOUS RED PHOSPHORS

(75) Inventor: Perry Niel Yocom, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 3 days.

(21) Appl. No.: 09/266,062

(22) Filed: Mar. 10, 1999

Related U.S. Application Data

(60) Provisional application No. 60/104,368, filed on Oct. 15, 1998.

(51) Int. Cl.$^7$ .................................................. B32B 5/16
(52) U.S. Cl. ........................ 428/403; 427/220; 427/221; 427/352; 427/407.1; 427/444; 428/407
(58) Field of Search ................................ 428/403, 407; 427/220, 221, 407.1, 444, 352

(56) References Cited

U.S. PATENT DOCUMENTS

| | | | |
|---|---|---|---|
| 2,372,071 A | 3/1945 | Fernberger | 252/301.4 |
| 2,521,124 A | 9/1950 | Miller | 252/301.4 |
| 2,522,074 A | 9/1950 | Urbach | 252/301.4 |
| 2,527,365 A | 10/1950 | Leverenz | 252/301.4 |
| 2,979,467 A | 4/1961 | Keller | 252/301.4 |
| 3,617,332 A | 11/1971 | Lehmann | |
| 3,791,844 A * | 2/1974 | Tecotzky et al. | 117/33.5 CM |
| 4,211,813 A | 7/1980 | Gravisse | 428/263 |
| 4,229,673 A * | 10/1980 | McAllister | 313/225 |
| 4,365,184 A | 12/1982 | Higton et al. | 313/503 |
| 4,507,562 A | 3/1985 | Gasiot et al. | 250/484.1 |
| 4,725,344 A | 2/1988 | Yocom | 204/192.15 |
| 5,043,096 A | 8/1991 | Lindmayer | 252/301.4 |
| 5,102,579 A | 4/1992 | Inaho et al. | 252/301.4 |
| 5,549,844 A * | 8/1996 | Bringley et al. | 252/301.4 |
| 5,650,094 A | 7/1997 | Royce et al. | 252/301.4 |

OTHER PUBLICATIONS

International Search Report for International PCT Applications No. PCT/US99/23927 dated Feb. 10, 2000.

* cited by examiner

*Primary Examiner*—H. Thi Le
(74) *Attorney, Agent, or Firm*—William J. Burke

(57) ABSTRACT

An adherent, transparent moisture barrier is applied to alkaline earth sulfide phosphor particles by stirring in an anhydrous polar solvent including a fluorinating compound present in a concentration of no higher than 0.02 molar until a transparent fluorine-containing moisture-impervious coating has been applied to the particles. The polar solvent is removed and the coated particles dried. A second moisture barrier can also be applied to ensure long term resistance of the phosphors to degradation by moisture.

13 Claims, No Drawings

COATED MOISTURE IMPERVIOUS RED PHOSPHORS

This application claims the benefit of U.S. provisional Application Ser. No. 60/104,368 filed Oct. 15, 1998.

This invention relates to the preparation of moisture impervious red phosphors. More particularly, this invention relates to coating red phosphor particles to impart moisture resistance.

BACKGROUND OF THE INVENTION

Red phosphors known until recently are rare, and they do not have long persistence. U.S. Pat. No. 5,650,094 to Royce et al discloses rare earth activated divalent titanate phosphors, such as calcium titanate or calcium-zinc-magnesium titanate, but the emission is visible for only a few minutes. Lindmayer, U.S. Pat. No. 5,043,096 reported a strontium sulfide based phosphor activated with three rare earths in the form of their oxides, and fluxed with a halide such as LiF. However, the fired phosphor was highly sintered and had to be ground to obtain a useful powdered material. But grinding degrades the emission and the ground phosphor has to be heated or annealed to repair crystal defect damage. However, the emission performance is never fully restored. These phosphors are described as useful for paint formulations.

Alkaline earth sulfides, such as calcium sulfide, strontium sulfide, magnesium sulfide and barium sulfide, have long persistence, but they are degraded after exposure to moisture. Calcium sulfide is the least reactive, and barium sulfide is most reactive with water. When exposed to a high humidity atmosphere, or to a liquid that contains water, the sulfides decompose. These materials are useful for the preparation of luminescent materials such as phosphors. However, their utility as phosphors is limited because of their moisture sensitivity. They must be encapsulated, as with a polymer or plastic, or mixed with a water impervious material such as a paint to improve their moisture resistance.

Long persistent red phosphors such as calcium sulfide or strontium sulfide are activated with the divalent rare earth element europium and trivalent rare earth elements such as praseodymium (Pr), neodymium (Nd) samarium (Sm), cerium (Ce), gadolinium (Gd), terbium (Tb), dysprosium (Dy), holmium (Ho) erbium (Er) thulium (Tm) and lutecium (Lu). Similar phosphors, but without the long persistence property, are useful in electroluminescent devices and cathode ray tubes. Long persistence in display devices however causes smearing of moving objects.

These phosphors can be made, as described in U.S. Pat. No. 4,725,344 to Yocom et al, by heating an alkaline earth metal halide and the activators to the melt temperature of the halide, and contacting the molten halide with hydrogen sulfide. The resulting alkaline earth metal sulfide can be formed into a dense, highly crystalline layer at comparatively low temperatures. Thus this method permits formation of thin phosphor films on glass substrates.

Powdered halide phosphors can be mixed with powdered alumina, which retards sintering of the phosphor to form a powdered phosphor. This powder can be added to a matrix material, such as powdered or molten plastic, fibers and the like, that encapsulate or encompass the phosphor, protecting it against the effects of moisture.

Activated strontium sulfide phosphors can also be made by firing at about 1200° C. in the presence of vaporized sulfur passed over a carbon source. This process forms an atmosphere of carbon disulfide. A fine particle size phosphor is obtained.

By long persistence phosphors it is meant that the spectral emission of the phosphors after excitation with light, emit red or orange-red colored light for several hours after the light source is removed. Such phosphors have many uses and are highly desirable for safety equipment for example.

Thus a search for an effective moisture resistant barrier layer for a red-emitting phosphor has continued. Most organic materials, such as polymers and plastics, are water permeable, and they are unable alone to form a long lasting moisture impervious phosphor coating. Fluoride coatings applied from aqueous media have also been tried, but they can degrade the luminescence properties of the phosphors. Thus a method of coating alkaline earth based phosphor particles which provide a moisture barrier but does not degrade the luminescent properties of the phosphor particles would be highly desirable.

SUMMARY OF THE INVENTION

Alkaline earth phosphor particles are dispersed in a polar anhydrous solvent which contains a low concentration of a reactive fluoride, to apply an adherent, transparent fluoride coating over the phosphor particles. The coating does not degrade the luminescent properties of the phosphor. After exposure, the phosphor particles are washed with a pure anhydrous solvent and dried. The resultant phosphor particles have excellent long term stability.

DETAILED DESCRIPTION OF THE INVENTION

Phosphors based on alkaline earth sulfides, such as strontium, barium and calcium sulfides, have many outstanding properties, particularly a long persistence red emission. However, in spite of the desirability of such phosphors, their utility has been limited because they degrade when exposed to moisture. Embedding the phosphor particles in plastic has been suggested, but since all plastics are somewhat moisture permeable, this is not a commercially practical solution. Other coatings are opaque, and thus would degrade the luminescent properties or even the coloration of the phosphors.

Thus in accordance with the method of the invention, a transparent fluoride coating is applied to red emitting phosphor particles by dispersing the particles in an anhydrous polar solvent, such as an alcohol, which contains a low concentration of a reactive fluoride.

Suitable reactive fluoride compounds can be chosen from ammonium fluoride ($NH_4F$), ammonium difluoride ($NH_4HF_2$), ammonium fluorosilicate ($NH_4SiO_3F$) and the like. These fluorides are soluble in anhydrous organic polar solvents and are added in amounts so as to form a solution having a fluoride concentration up to about $10^{-2}M$, and preferably less than about $10^{-3}M$. Acidic fluorides, such as ammonium fluoride, can react with the sulfide phosphors to form the corresponding fluoride, but by maintaining a low concentration of the fluoride, the reaction between the fluoride and the sulfide phosphor particles will be slow enough to form a fluoride coating without destroying the sulfide phosphor to any great extent.

Suitably about 10 parts by weight of sulfide phosphor particles are dispersed in an anhydrous polar solvent to which has been added ammonium fluoride or other suitable fluorinating agent, to a concentration of about 0.001 molar. The dispersion is stirred gently for about 10 minutes, and the solvent is decanted off. These now fluorine coated phosphor particles are washed one or more times with pure solvent and dried. This coating method can be repeated if desired, or another organic based material can be applied to the phosphor particles to give long term resistance to degradation by moisture.

The preferred polar solvents include those having the formula R—OH wherein R is alkyl or alkenyl of up to eight carbon atoms. The most preferred solvents are methanol and ethanol.

The fluoride coatings applied to phosphor particles in this manner are highly transparent, insoluble materials which coat and protect the phosphor particles from degradation by moisture without interfering with the luminescent properties of the phosphor.

A second coating, as of a transparent organic material, can also be applied over the fluorine-containing coating, such as a transparent polymeric coating of an acrylate or the like.

Although the present method has been described in terms of specific solvents and concentrations of fluoride, other solvents and fluorinating agents and other concentrations can be used as will be known to one skilled in the art, and are meant to be included herein. The invention is only meant to be limited by the scope of the appended claims.

I claim:

1. A method for treating red emitting alkaline earth sulfide phosphor particles to provide moisture resistance which comprises
    a) dispersing said phosphor particles in an anhydrous polar organic solvent containing a fluorinating agent at a concentration of about 0.01 molar or less,
    b) stirring said dispersion for a time sufficient to form a moisture impervious fluorinated coating on the phosphor particles, and
    c) removing the solvent and excess fluorinating agent.

2. A method according to claim 1 wherein the concentration of the fluorinating compound is 0.001 molar or less.

3. A method according to claim 1 wherein said alkaline earth sulfide is selected from the group consisting of calcium, strontium and barium sulfides.

4. A method according to claim 1 wherein said solvent is selected from the group consisting of alcohols having the formula ROH wherein R is an alkyl or alkenyl group of up to eight carbon atoms.

5. A method according to claim 4 wherein R is methyl.

6. A method according to claim 4 wherein R is ethyl.

7. A method according to claim 1 wherein after coating the phosphor particles with the fluorinating agent, the particles are washed with additional anhydrous polar solvent.

8. A method according to claim 1 wherein the fluorinating agent is a compound selected from the group consisting of ammonium fluoride, ammonium difluoride and ammonium fluorosilicate.

9. A method according to claim 1 wherein after a fluoride coating has been applied to the phosphor particles, a transparent organic polymer coating is applied thereover.

10. A method according to claim 9 wherein said transparent organic polymer coating is an acrylate-containing polymer.

11. A red emitting alkaline earth sulfide phosphor particle having an adherent, transparent fluorine-containing coating thereover and a second coating of a transparent organic polymer.

12. A phosphor particle according to claim 11 wherein said alkaline earth sulfide is selected from the group consisting of calcium sulfide, strontium sulfide and barium sulfide.

13. A phosphor particle according to claim 11 wherein said second organic polymer coating is an acrylate-containing polymer.

* * * * *